R. L. MARVIN.
EGG HOLDER.
APPLICATION FILED OCT. 20, 1913.
1,124,050.
Patented Jan. 5, 1915.
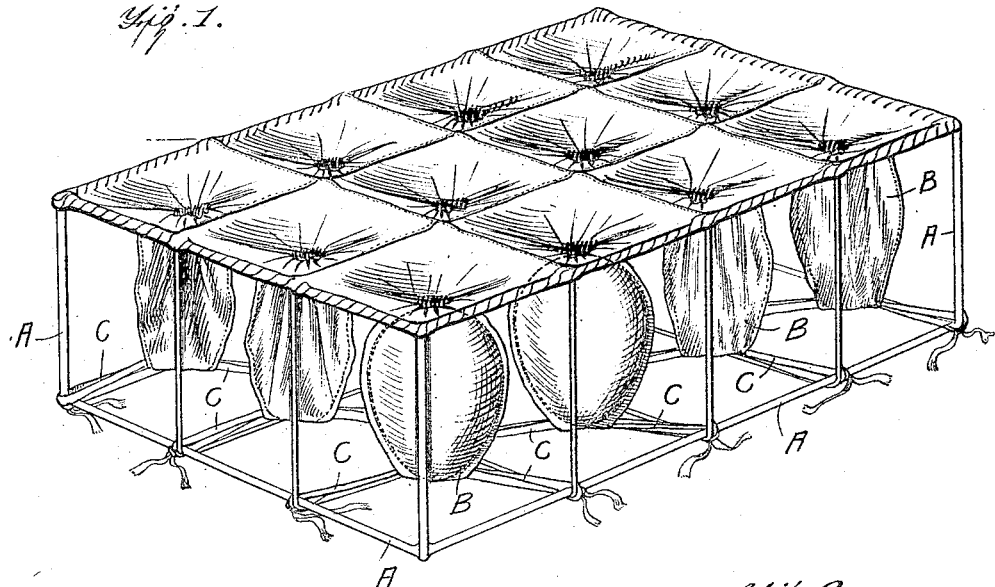
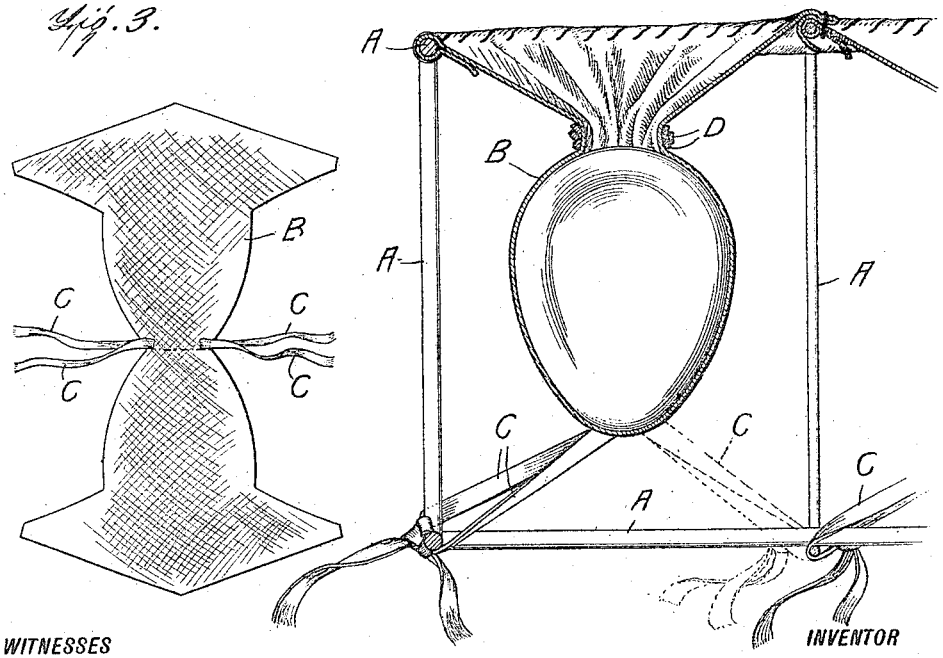
WITNESSES
INVENTOR
Roy Lee Marvin,
BY
ATTORNEYS

UNITED STATES PATENT OFFICE.

ROY LEE MARVIN, OF PORTLAND, OREGON, ASSIGNOR OF ONE-THIRD TO ALFRED O. TEMPLE, OF PORTLAND, OREGON.

EGG-HOLDER.

1,124,050.   Specification of Letters Patent.   Patented Jan. 5, 1915.

Application filed October 20, 1913. Serial No. 796,189.

*To all whom it may concern:*

Be it known that I, ROY LEE MARVIN, a citizen of the United States, and a resident of Portland, in the county of Multnomah and State of Oregon, have made certain new and useful Improvements in Egg-Holders, of which the following is a specification.

My present invention relates to egg holders and more particularly to a device whereby eggs may be safely held in carrying, shipment, storage, or in otherwise handling the same.

In carrying out my invention I provide a frame divided into a plurality of compartments, each compartment having a flexible egg sling so disposed and held within the frame that the egg carried thereby is prevented from contact either with any portion of the frame or any other egg held thereby.

In the accompanying drawing which illustrates my invention, Figure 1 is a perspective view of a device constructed in accordance with my invention, Fig. 2 is a vertical longitudinal section taken through one end portion of the device shown in Fig. 1 and on an enlarged scale, and Fig. 3 is a plan view of the blank of the sling.

Referring now to these figures it will be seen that I preferably provide a frame formed of a plurality of wires A sufficiently stiff for the purpose, these wires being laid vertically and longitudinally in such manner as to form a rectangular structure, and to divide the same into a plurality of compartments.

Each of the compartments thus formed is provided with an egg sling constructed from a blank such as indicated at B in Fig. 3, this blank having a narrow central portion and gradually enlarging intermediate portions upon opposite sides of this narrow central portion, the intermediate portions merging at their outer ends into flaring end portions which, when brought together by stitching or otherwise suitably securing the intermediate portions along their side edges, form a rectangular upper portion, the side edges of which are stitched or otherwise suitably secured around upper wires of its particular compartment in the frame, it being further noted that the central portion of the blank is provided with flexible tabs or connections C by which the lower portion of the sling when formed and properly positioned within the frame, may be secured to the lower wires of the frame as particularly shown in Figs. 1 and 2. Thus each sling, when connected within its particular compartment is open at its upper end to provide for the introduction of an egg, it being noted from Figs. 1 and 2 that the egg is introduced point downward and a flexible tie member D is secured around the sling above the butt end of the egg for the purpose of closing the sling and immovably holding the egg therein. In this manner the eggs are supported and held without danger of contact either with any portion of the frame or with one another and may for this reason be safely carried, stored, or otherwise transported and handled.

I claim:

1. An egg holder of the character described, comprising the combination of a skeleton frame formed of a plurality of relatively stiff wires, said frame being substantially rectangular in shape and having intermediate wires crossed at its upper and lower portions, whereby to form a plurality of compartments, egg slings disposed in the several compartments and each consisting of a fabric egg pocket open at its upper end and having its upper edges secured around the upper crossed frame wires of its respective compartment, flexible tabs connected to the lower ends of each of the egg slings for connection with the lower wires of the frame in order to prevent excessive lateral movement of the slings, and flexible tie members whereby the upper portions of the slings may be drawn in to securely embrace and hold the eggs, substantially as described.

2. An egg holder of the character described, comprising a skeleton frame forming a plurality of open compartments, an egg sling disposed in each of the said compartments and consisting of a section of fabric material having a depending egg pocket open at its upper end and having an upper substantially rectangular portion, the edges of which are secured around portions of the skeleton frame at the upper end of the respective compartment, flexible tabs extending from the lower end of the egg pocket for connection with the frame at the lower end of the respective compartment, and flexible tie members secured around the egg sling between an egg disposed therein and the upper rectangular portion thereof to tightly close the mouth of the egg pocket.

ROY LEE MARVIN.

Witnesses:
J. W. WESTBROOK,
CHARLOTTE M. HARRIS.